US011859714B2

(12) United States Patent
Yukawa et al.

(10) Patent No.: US 11,859,714 B2
(45) Date of Patent: Jan. 2, 2024

(54) POWER TRANSMISSION DEVICE

(71) Applicants: JATCO LTD, Fuij (JP); Nissan Motor Co., Ltd., Yokohama (JP)

(72) Inventors: Hirohisa Yukawa, Tokyo (JP); Katsunori Yamashita, Kanagawa (JP); Hideyuki Mamiya, Shizuoka (JP)

(73) Assignees: Jatco Ltd, Fuji (JP); Nissan Motor Co., Ltd., Yokohama (JP)

( * ) Notice: Subject to any disclaimer, the term of this patent is extended or adjusted under 35 U.S.C. 154(b) by 72 days.

(21) Appl. No.: 17/623,440

(22) PCT Filed: Jul. 21, 2020

(86) PCT No.: PCT/JP2020/028321
§ 371 (c)(1),
(2) Date: Dec. 28, 2021

(87) PCT Pub. No.: WO2021/015205
PCT Pub. Date: Jan. 28, 2021

(65) Prior Publication Data
US 2022/0349469 A1 Nov. 3, 2022

(30) Foreign Application Priority Data
Jul. 25, 2019 (JP) .................................. 2019-136877

(51) Int. Cl.
*F16H 61/28* (2006.01)
*F16H 57/04* (2010.01)
*F16H 61/00* (2006.01)
*F16H 61/662* (2006.01)
*F16H 61/32* (2006.01)

(52) U.S. Cl.
CPC ..... *F16H 61/2807* (2013.01); *F16H 57/0436* (2013.01); *F16H 61/0006* (2013.01); *F16H 61/662* (2013.01); *F16H 2061/326* (2013.01)

(58) Field of Classification Search
CPC ............. F16H 61/2807; F16H 57/0436; F16H 61/0006; F16H 61/662; F16H 2061/326
See application file for complete search history.

(56) References Cited

U.S. PATENT DOCUMENTS 9,849,791 B2 * 12/2017 Suzuki .................... B60L 1/003

FOREIGN PATENT DOCUMENTS

| JP | 2016-223452 A | 12/2016 |
| JP | 2019-019887 A | 2/2019 |
| WO | 2019/176329 A1 | 1/2021 |

* cited by examiner

*Primary Examiner* — Jake Cook
(74) *Attorney, Agent, or Firm* — Global IP Counselors, LLP (57) ABSTRACT

A power transmission device includes a power transmission mechanism, an oil pump, a first electric wire, a controller and a control unit. The power transmission mechanism is arranged in a first chamber. The oil pump is arranged in a second chamber. The control unit is connected with the controller via the first electric wire. The first electric wire is provided inside the second chamber, and is arranged at a position that does not overlap with the oil pump when viewed along a first direction that is a direction facing from the oil pump to the controller.

15 Claims, 7 Drawing Sheets

POWER TRANSMISSION DEVICE

CROSS-REFERENCE TO RELATED APPLICATIONS

This is a U.S. national phase application of PCT/JP2020/028321, filed on Jul. 21, 2020, which claims priority to Japanese Patent Application No. 2019-136877, filed on Jul. 25, 2019. The entire disclosure of Japanese Patent Application No. 2019-136877 is hereby incorporated herein by reference.

TECHNICAL FIELD

The present invention relates to a power transmission device.

BACKGROUND ART

Disclosed in Japanese Laid-Open Patent Publication No. 2019-19887 is a power transmission device in which wiring is arranged between an oil pump and a controller (ATCU).

SUMMARY

When wiring is arranged between the oil pump and the controller as with the power transmission device of Japanese Laid-Open Patent Publication No. 2019-19887, the dimension in the direction facing from the oil pump to the controller increases.

In light of that, there is a need to provide a power transmission device in which the increase in the dimension in the direction facing from the oil pump to the controller is suppressed.

One embodiment of the present invention is a power transmission device having a first chamber in which a power transmission mechanism is arranged, and a second chamber in which an oil pump is arranged, wherein the power transmission device has a first electric wire, a controller, and a control unit connected with the controller via the first electric wire, and the first electric wire is provided inside the second chamber, and is arranged at a position that does not overlap with the oil pump in a first direction which is the direction facing from the oil pump to the controller.

According to one embodiment of the present invention, it is possible to provide a power transmission device in which an increase in the dimension of the direction facing from the oil pump to the controller is suppressed.

DETAILED DESCRIPTION OF EMBODIMENTS

Hereafter, an example is explained of when a power transmission device of the present embodiment is a belt-type continuously variable transmission 1 for a vehicle.

In the explanation hereafter, as terminology for explaining the positional relationship of the constituent elements, when "orthogonal" and "parallel" are used, these do not mean "orthogonal" and "parallel" in the strictest meaning with respect to an axis (line) or surface used as a reference.

Cases of being orthogonal with a slight tilt or being parallel with a slight tilt with respect to an axis (line) or surface used as a reference are not excluded. These cases are also included in the terms "orthogonal" and "parallel."

Figure 1:
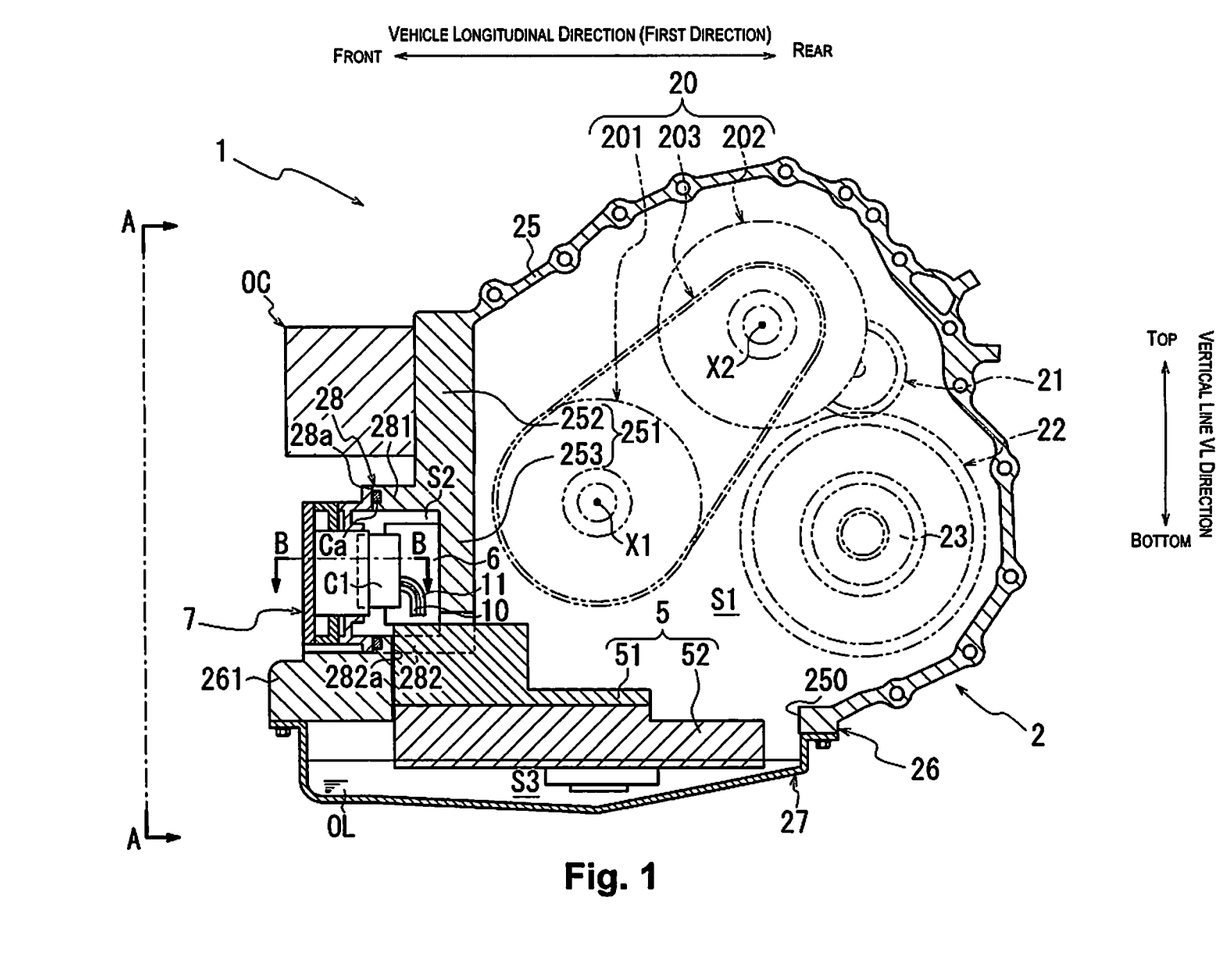
FIG. 1 is a schematic block diagram for explaining the arrangement of each constituent element of a power transmission device inside a transmission case.

FIG. 1 is a drawing that schematically shows the arrangement of each constituent element of the continuously variable transmission 1 inside a transmission case 2. In FIG. 1, a variator 20, a gear train 21, a final gear 22, and a differential device 23 are shown in simplified form with virtual lines.

Figure 2:
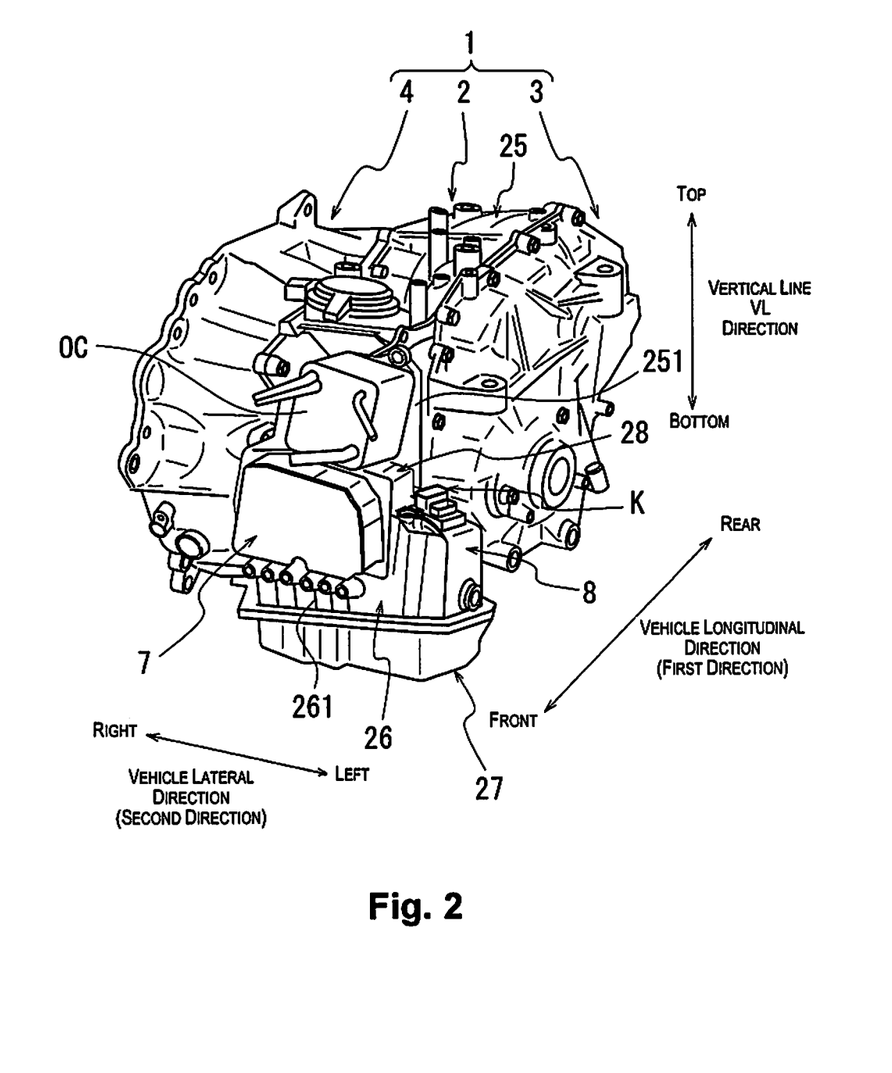
FIG. 2 is a drawing for explaining the power transmission device.

FIG. 2 is a drawing for explaining the continuously variable transmission 1, and is a perspective view of the continuously variable transmission 1 when seen from the A-A direction in FIG. 1.

In this specification and in the drawings, the vehicle longitudinal direction (first direction) and the vehicle lateral direction (second direction) mean the directions seen by a driver riding in the vehicle.

As shown in FIG. 1, the variator 20 as the power transmission mechanism of the continuously variable transmission 1 has a primary pulley 201, a secondary pulley 202, and a power transmission member 203.

As the power transmission member 203, it is possible, for example, to use a belt configured with plate-shaped elements (not illustrated) having slits at both sides layered and arranged in a ring shape, with each element inserted in the slits and bound into an annular ring.

The primary pulley 201 has the rotational drive force of a drive source (not illustrated) inputted and rotates around a rotation axis X1 (axis center of the primary pulley 201).

The secondary pulley 202 is provided to be able to rotate around a rotation axis X2 (axis center of the secondary pulley 202) that is parallel to the rotation axis X1. These rotation axes X1, X2 are parallel to the vehicle lateral direction (left-right direction in FIG. 2).

The power transmission member 203 is wound around the outer periphery of the primary pulley 201 and the outer periphery of the secondary pulley 202. The rotational drive force inputted to the primary pulley 201 is transmitted to the secondary pulley 202 via the power transmission member 203.

In the variator 20, when the rotational drive force is transmitted from the primary pulley 201 to the secondary pulley 202, the winding radius of the power transmission member 203 in the primary pulley 201 and the winding radius of the power transmission member 203 in the secondary pulley 202 are changed. As a result, the rotational drive force inputted to the primary pulley 201 is shifted at a desired gear ratio, and is transmitted to the secondary pulley 202.

The gear ratio is determined according to the winding radius of the power transmission member 203 in the primary pulley 201 and the secondary pulley 202. The winding radius is determined by a transmission controller 9 based on the travelling state, etc., of a vehicle in which the continuously variable transmission 1 is mounted.

The rotational drive force transmitted to the secondary pulley 202 is ultimately transmitted to drive wheels (not illustrated) via a gear train 21, a final gear 22, and a differential device 23.

An outer peripheral wall 25 of the transmission case 2 has a first chamber S1 that houses the variator 20, the gear train 21, the final gear 22, and the differential device 23 formed inside the transmission case 2.

As shown in FIG. 2, the transmission case 2 has a side cover 3 attached from one side (right side in the drawing) sandwiching the transmission case 2. Furthermore, a converter housing 4 is attached from the other side (left side in the drawing).

The continuously variable transmission 1 is attached to the drive source (not illustrated) in a state with the overlapping direction of the transmission case 2, the side cover 3, and the converter housing 4 aligned in the vehicle lateral direction (vehicle width direction).

As shown in FIG. 1, the transmission case 2 has a peripheral wall part 26 surrounding a lower opening 250 of the transmission case 2.

An oil pan 27 is attached from the lower side in the vertical line VL direction to the peripheral wall part 26 of the transmission case 2. The oil pan 27 blocks the lower opening 250 of the transmission case 2 in a state fixed to the peripheral wall part 26. The oil pan 27 forms a third chamber S3 that becomes a storage space for hydraulic oil OL (oil) at the bottom of the transmission case 2.

A control valve unit 5 is arranged inside the third chamber S3.

The control valve unit 5 is configured with an upper valve 51 and a lower valve 52 overlapping. A separator plate (not illustrated) is provided between the upper valve 51 and the lower valve 52. The upper valve 51 and the lower valve 52 each have an oil passage (not illustrated) formed inside, and together with the separator plate configure a hydraulic control circuit.

The control valve unit 5 is housed in the third chamber S3 in a state with the overlapping direction of the upper valve 51 and the lower valve 52 aligned in the vertical line VL direction.

In the present embodiment, in the interior space of the transmission case 2, the upper side of the vertical line VL direction is the first chamber S1, and the lower side is the third chamber S3. The capacity of the first chamber S1 is set to be sufficiently larger than the capacity of the third chamber S3.

As shown in FIG. 1, the region at the front side of the vehicle in the outer peripheral wall 25 (left side in the drawing) is a partition wall part 251 extending in the vertical line VL direction.

The partition wall part 251 has an oil cooler OC and an electric oil pump 6 mounted. In the partition wall part 251, the electric oil pump 6 is provided further to the oil pan 27 side (lower side in the vertical line VL direction) than the oil cooler OC.

The partition wall part 251 has a first wall 252 on which the oil cooler OC is mounted, and a second wall 253 on which the electric oil pump 6 is mounted. The second wall 253 is positioned below the first wall 252 in the vertical line VL direction.

As shown in FIG. 1, a bulging region 261 that bulges to the vehicle front side is provided on the peripheral wall part 26 surrounding the lower opening 250 of the transmission case 2. The bulging region 261 bulges to the vehicle front side more than the partition wall part 251.

A wall part 28 that surrounds the electric oil pump 6 is provided in the region between the bulging region 261 and the oil cooler OC in the vertical line VL direction. In the transmission case 2, the region surrounded by the wall part 28 is a second chamber S2 that becomes the housing space for the electric oil pump 6. A lid part 7 is attached from the vehicle front side (left side in FIG. 1) to the wall part 28.

Figure 3:
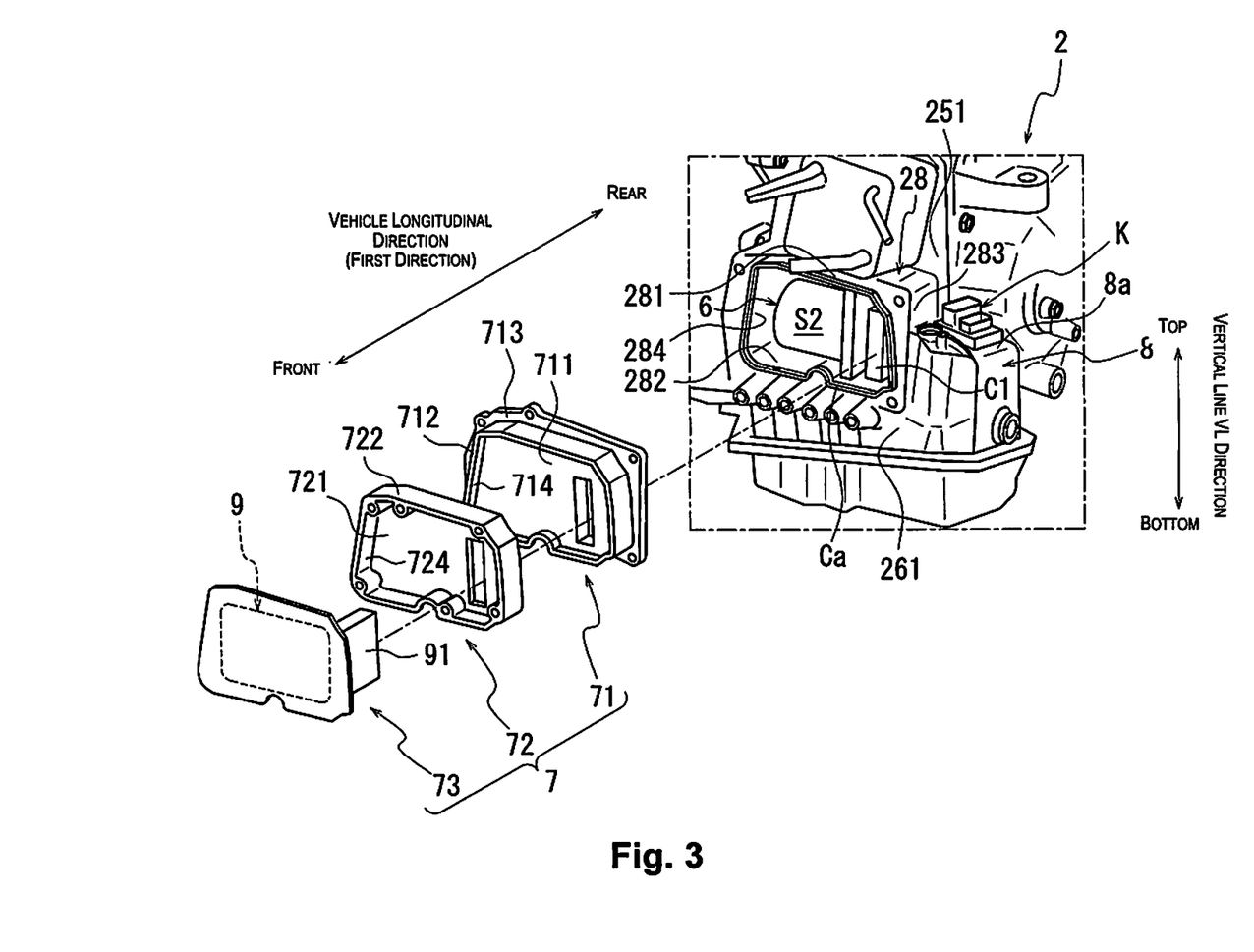
FIG. 3 is a main part enlarged view of the power transmission device.

FIG. 3 is a main part enlarged view of the continuously variable transmission 1 and shows the lid part 7 separated from the transmission case 2, and is also an exploded perspective view showing the lid part 7 disassembled.

Figure 4:
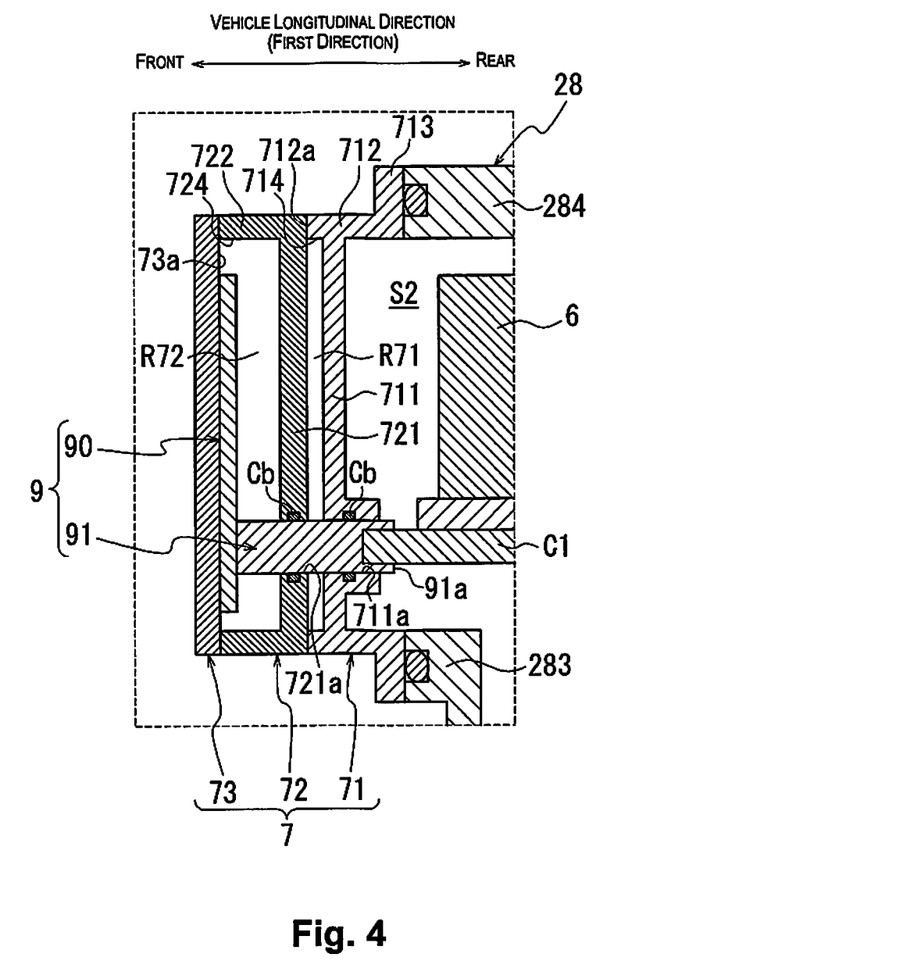
FIG. 4 is a schematic diagram for explaining a lid part.

FIG. 4 is a drawing for explaining the lid part 7, and is a schematic diagram of cross section B-B in FIG. 1. For convenience of explanation, bolts are omitted in FIGS. 3 and 4.

Figure 5:
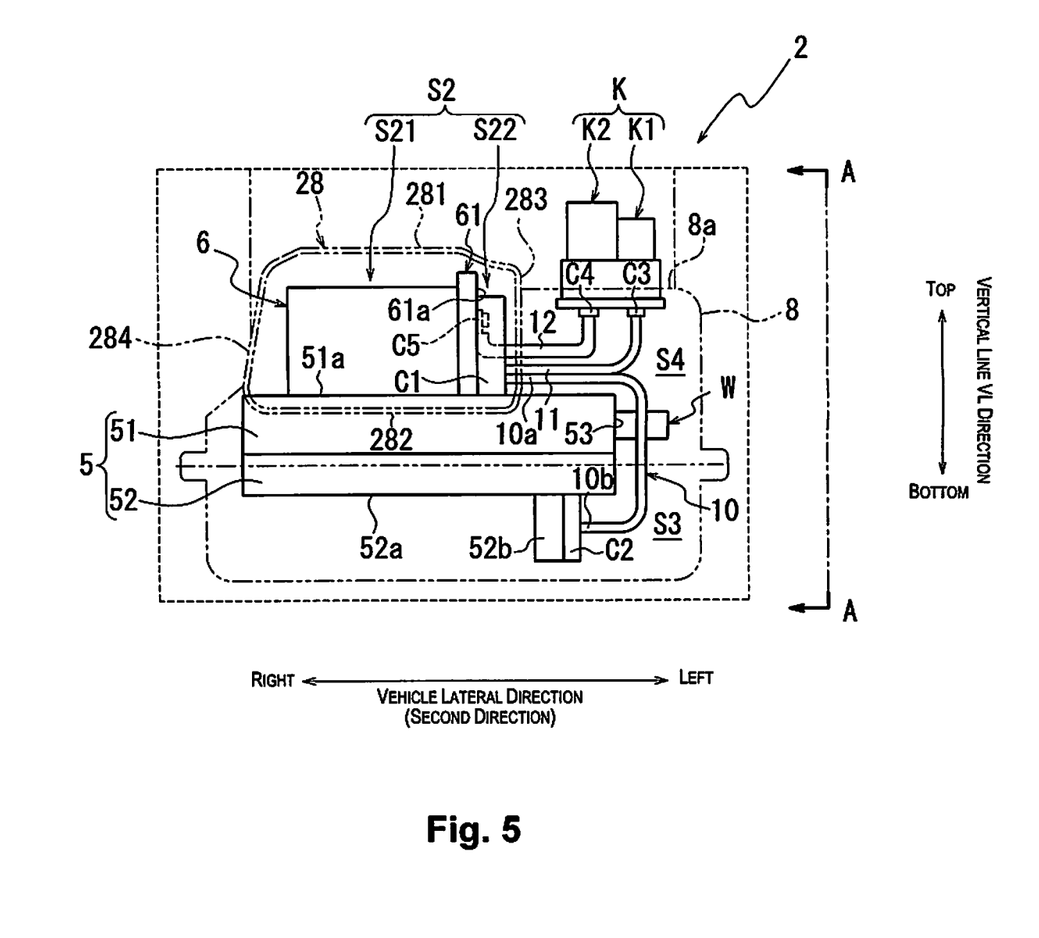
FIG. 5 is a schematic diagram for explaining the arrangement of the electric wire.

FIG. 5 is a schematic diagram for explaining the arrangement of the wire harness, and is a drawing seen from the vehicle front side around the electric oil pump 6 and the control valve unit 5. To make the positional relationship easier to understand, the transmission case 2 is shown by virtual lines.

Figure 6:
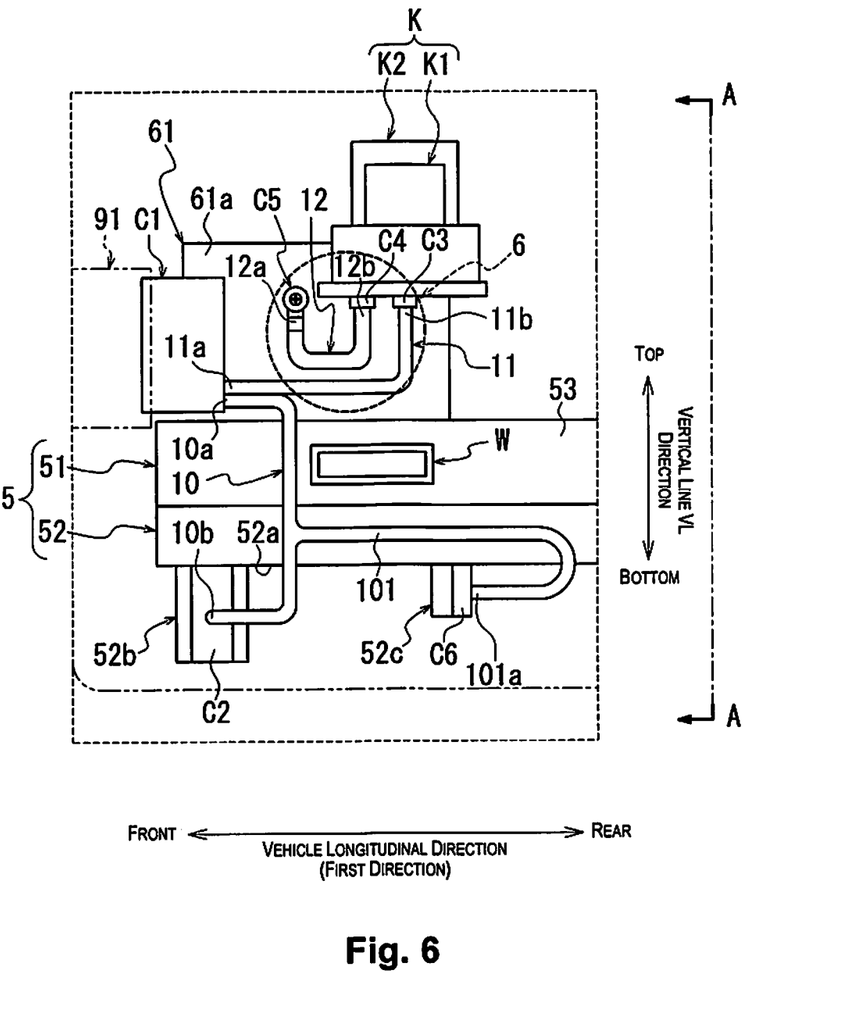
FIG. 6 is a schematic diagram for explaining the arrangement of the electric wire.

FIG. 6 is a schematic diagram for explaining the arrangement of the wire harness, and is a drawing seen from the A-A arrow direction in FIG. 5.

In FIG. 6, for convenience of explanation, a connector part 91 of the transmission controller 9 is shown by virtual lines, and the outline of the electric oil pump 6 arranged at the paper surface back side of a side plate 61 is shown by dashed lines.

Figure 7:
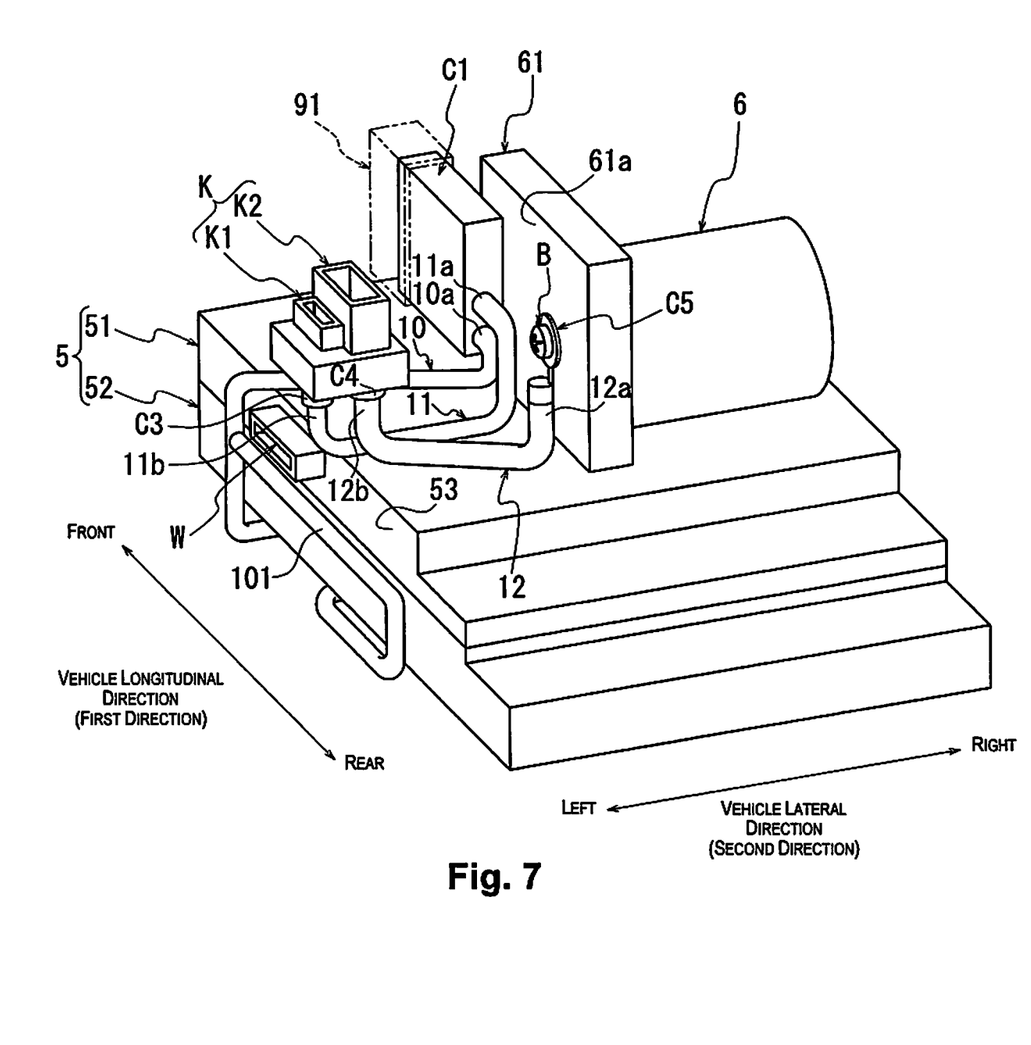
FIG. 7 is a perspective view for explaining the arrangement of the electric wire.

FIG. 7 is a schematic diagram for explaining the arrangement of the wire harness, and is a perspective view seen from the A-A arrow direction in FIG. 6. In FIG. 7, to make the positional relationship easier to understand, the connector part 91 of the transmission controller 9 is shown by virtual lines.

As shown in FIG. 3, the wall part 28 has an upper wall part 281 extending from the partition wall part 251 to the vehicle front side. The wall part 28 also has a lower wall part 282 provided integrally with the bulging region 261, and side wall parts 283, 284 that connect the end parts of the upper wall part 281 and the lower wall part 282 to each other, and that extend in the vertical line VL direction.

The wall part 28 is formed in a cylindrical shape from the upper wall part 281, the lower wall part 282, and the side wall parts 283, 284. The second chamber S2 is a space surrounded by the upper wall part 281, the lower wall part 282, and the side wall parts 283, 284.

The upper wall part 281 configuring a portion of the wall part 28 is provided in a range covering the upper side of the electric oil pump 6. The upper wall part 281 extends to the vehicle front side from the boundary of the abovementioned first wall 252 and the second wall 253 (see FIG. 1).

As shown in FIG. 2, a bulging wall 8 described later is adjacent to one side (right side in the drawing) of the wall part 28 in the vehicle lateral direction. The bulging wall 8 is positioned at the side cover 3 side of the wall part 28 in the vehicle lateral direction.

As shown in FIG. 1, a communication hole 282a is provided in the region positioned below the oil pan 27 in the wall part 28. The communication hole 282a is formed to straddle the lower wall part 282 and the second wall 253. The communication hole 282a communicates between the second chamber S2 surrounded by the wall part 28, and the third chamber S3 surrounded by the oil pan 27.

Inside the second chamber S2, the electric oil pump 6 is fixed straddling the second wall 253 and the upper valve 51 of the control valve unit 5.

In addition to the electric oil pump 6, a connector terminal C1 and a power supply connector C5 are housed inside the second chamber S2 (see FIG. 5).

The connector terminal C1 is a connection terminal for connecting wiring extending from the control valve unit 5 side to the transmission controller 9 described later. The power supply connector C5 is a connection terminal for supplying power supplied via a power supply line 12 described later to the electric oil pump 6.

In the present embodiment, the connector terminal C1 and the power supply connector C5 are each attached to a component (side plate 61) on the electric oil pump 6. The connector terminal C1 and the power supply connector C5 are positioned at a prescribed position within the second chamber S2.

As shown in FIG. 1, the wall part 28 surrounding the second chamber S2 opens to outside of the transmission case 2. The opening of the wall part 28 is blocked by the lid part 7 fixed to a tip surface 28a of the vehicle front side (left side in the drawing) of the wall part 28.

A seal ring Ca that surrounds the wall part 28 across the entire periphery is fitted on the tip surface 28a of the vehicle front side of the wall part 28. The lid part 7 is fixed to the wall part 28 by a bolt (not illustrated), etc., in a state with the seal ring Ca interposed between it and the wall part 28.

[Lid Part]

As shown in FIG. 3, the lid part 7 is configured from a first wall part 71, a second wall part 72, and a third wall part 73. The lid part 7 is formed with the first wall part 71, the second wall part 72, and the third wall part 73 overlapped in order in the vehicle longitudinal direction.

As shown in FIG. 4, the first wall part 71 has a bottom wall 711 formed at a size that blocks the opening of the wall part 28, and a peripheral wall part 712 that surrounds the outer peripheral edge of the bottom wall 711 across the entire periphery.

A flange part 713 that surrounds the outer periphery of the peripheral wall part 712 across the entire periphery is provided on the end part of the wall part 28 side (right side in the drawing) on the peripheral wall part 712. The flange part 713 is joined to the wall part 28 from the opening direction of the second chamber S2.

The bottom wall 711 is provided at a position separated from the flange part 713 side (right side in the drawing) from one end 712a of the peripheral wall part 712.

The first wall part 71 has a recess 714 surrounded by the bottom wall 711 and the peripheral wall part 712 on the side opposite to the second chamber S2 in the vehicle longitudinal direction. The recess 714 opens at the side opposite to the second chamber S2 in the vehicle longitudinal direction.

The opening of the recess 714 is blocked by the second wall part 72. A space R71 is formed between the recess 714 and the second wall part 72.

The second wall part 72 is configured from a bottom wall 721 formed at a size that blocks the opening of the recess 714, and a peripheral wall part 722 surrounding the bottom wall 721 across the entire periphery.

The peripheral wall part 722 extends in the direction separating from the first wall part 71 (leftward in the drawing) in the vehicle longitudinal direction. The second wall part 72 has a recess 724 surrounded by the bottom wall 721 and the peripheral wall part 722. The recess 724 opens at the side opposite to the first wall part 71 in the vehicle longitudinal direction.

The opening of the recess 724 is sealed by the third wall part 73. A space R72 is formed between the recess 724 and the third wall part 73.

The third wall part 73 is a plate-shaped member formed at a size that blocks the opening of the recess 724, and the transmission controller 9 is attached to a surface 73a facing the second wall part 72 in the vehicle longitudinal direction.

The transmission controller 9 overlaps in the vehicle longitudinal direction with respect to the abovementioned first chamber S1 and the electric oil pump 6 (see FIG. 1).

As shown in FIG. 4, the transmission controller 9 comprises a plate-shaped substrate 90, and the connector part 91 that is electrically connected with wiring (not illustrated) on the substrate 90.

The substrate 90 is attached to the third wall part 73 in a state with the thickness direction of the substrate 90 aligned with the vehicle longitudinal direction. In this state, the substrate 90 is arranged inside the space R72 in the lid part 7.

The connector part 91 is fixed to the surface on the opposite side to the third wall part 73 in the thickness direction of the substrate 90. The connector part 91 extends to the second chamber S2 side in the vehicle longitudinal direction.

Seen from the opening side of the second chamber S2 (left side in the drawing), on the bottom wall 721 of the second wall part 72 and the bottom wall 711 of the first wall part 71, through holes 721a, 711a are provided at a position overlapping the connector part 91.

The through holes 721a, 711a are formed in a shape that matches the outline of the connector part 91. The connector part 91 penetrates the bottom wall 721 of the second wall part 72 and the bottom wall 711 of the first wall part 71 at the second chamber S2 side (right side in the drawing). A tip 91a of the connector part 91 is exposed inside the second chamber S2.

Inside the second chamber S2, the abovementioned connector terminal C1 is internally fitted on the tip 91a side of the connector part 91 of the transmission controller 9. As a result, the connector part 91 and the connector terminal C1 are electrically connected.

Here, sealing materials Cb, Cb are provided on the inner periphery of the through holes 711a, 721a provided in the bottom walls 711, 721, and the sealing materials Cb, Cb are press welded on the outer periphery of the connector part 91.

For that reason, the hydraulic oil OL inside the second chamber S2 is made to pass through the gap between the inner periphery of the through holes 711a, 721a, and the outer periphery of the connector part 91, and to not infiltrate inside the space R72 that houses the transmission controller 9.

Furthermore, the entry of contaminants inside the second chamber S2 from outside the transmission case 2 by passing through the gap between the inner periphery of the through holes 711a, 721a and the outer periphery of the connector part 91 is suppressed.

With the lid part 7, the space R71 (air layer) is formed between the second chamber S2 and the transmission controller 9 (substrate 90) (see FIG. 4).

When driving the continuously variable transmission 1, the oil (hydraulic oil OL) used for operating and lubricating the variator 20 goes to high temperature. For that reason, inside the second chamber S2 that houses the electric oil pump 6 becomes high temperature by the heat generated by the electric oil pump 6 and the heat of the hydraulic oil OL.

With the present embodiment, the space R71 is formed between the space R72 that houses the transmission controller 9 and the second chamber S2.

For that reason, the air layer inside the space R71 functions as a heat insulating layer, suppressing the transmission of heat on the second chamber S2 side to the substrate 90 of the transmission controller 9.

It is also possible to have a configuration in which a heat insulating material is provided in the space R71, to function even better as a heat insulating layer.

Following, the positional relationship of each connector in the transmission case 2 is explained.

As shown in FIG. 5, the wall part 28 forms an approximately rectangular ring shape when seen from the vehicle front side.

The upper wall part 281 and the lower wall part 282 in the wall part 28 extend aligned with the vehicle lateral direction in a state with a gap open in the vertical line VL direction. The side wall parts 283, 284 in the wall part 28 each connect the end parts of the upper wall part 281 and the lower wall part 282 to each other at one side and the other side in the vehicle lateral direction, and extend aligned with the vertical line VL.

The electric oil pump 6 housed inside the second chamber S2 on the inside of the wall part 28 is provided with the lengthwise direction of the electric oil pump 6 facing aligned with the vehicle lateral direction (vehicle width direction).

The electric oil pump 6 has the side plate 61 on the end part of the side wall part 283 side (right side in FIG. 5). The power supply connector C5 and the connector terminal C1 are attached to a surface 61a facing the side wall part 283 in the side plate 61. Specifically, the power supply connector C5 and the connector terminal C1 are attached to the side plate 61 which is a component of the electric oil pump 6 side.

In this state, the connector terminal C1 is arranged further to the vehicle front side (paper surface front side in FIG. 5) than the power supply connector C5 in the vehicle longitudinal direction. The power supply connector C5 is fixed by a bolt B to the electric oil pump 6 (side plate 61) (see FIG. 7).

The second chamber S2 is partitioned into a first space S21 and a second space S22 with the side plate 61 of the electric oil pump 6 as a boundary.

Using the side plate 61 as a reference, the electric oil pump 6 side in the vehicle lateral direction is the first space S21, and the connector terminal C1 side is the second space S22.

In the transmission case 2, the bulging wall 8 is provided adjacent to the side wall part 283. In the vehicle lateral direction, the bulging wall 8 bulges in the direction separating from the side wall part 283 (rightward in FIG. 5).

The bulging wall 8 is provided straddling the side wall part 283 and the bulging region 261 of the abovementioned peripheral wall part 26 (see FIG. 3). The bulging wall 8 is formed integrally with the side wall part 283.

As shown in FIG. 5, the bulging wall 8 has an interior space S4. The interior space S4 of the bulging wall 8 communicates between the second space S22 of the second chamber S2 and the abovementioned third chamber S3.

A top surface 8a of the bulging wall 8 is a flat surface orthogonal to the vertical line VL.

An external connection connector K is provided on the bulging wall 8. The external connection connector K penetrates the top surface 8a of the bulging wall 8 from the lower side to the upper side in the vertical line VL direction. In this state, the external connection connector K has one side in the vertical line VL direction housed in the interior space S4, and the other side exposed to the exterior space of the transmission case 2.

The external connection connector K comprises a first connector K1 and a second connector K2.

The first connector K1 is electrically connected with various electrical components (not illustrated) arranged outside the transmission case 2. The second connector K2 is electrically connected with a power supply (not illustrated) that supplies power to the electric oil pump 6.

The external connection connector K comprises terminal parts C3, C4 at one side in the vertical line VL direction. The terminal parts C3, C4 are respectively connected to the first connector K1 and the second connector K2, and are housed inside the interior space S4.

As shown in FIG. 6, the terminal part C3 and the terminal part C4 are arranged at positions that overlap with the electric oil pump 6 in the paper surface front-back direction. In FIG. 6, the outline of the electric oil pump 6 positioned at the paper surface back side is shown by dashed lines.

As shown in FIG. 5, with the present embodiment, the terminal part C4 is arranged at a position closer to the electric oil pump 6 in the vehicle lateral direction than the terminal part C3.

[Wire Harness]

As shown in FIG. 5 to FIG. 7, the electric oil pump 6, the transmission controller 9, the control valve unit 5, and the external connection connector K are electrically connected via a plurality of wire harnesses (electric wires). This plurality of wire harnesses are arranged so as to pass through the abovementioned second chamber S2, third chamber S3, and interior space S4 interior.

As shown in FIG. 5, the abovementioned control valve unit 5 cuts across the lower side of the electric oil pump 6 and the connector terminal C1 in the vehicle lateral direction, and extends to the lower side of the external connection connector K.

A range switching device W projects to the left side surface 53 of the control valve unit 5. Examples of the range switching device W include known inhibitor switches, etc.

As shown in FIG. 6, the control valve unit 5 cuts across the electric oil pump 6, the connector terminal C1, and the external connection connector K lower side in the vehicle longitudinal direction, and extends to the lower side of the abovementioned variator 20 (see FIG. 1).

The control valve unit 5 has a first connector part 52b and a second connector part 52c on the bottom surface 52a of the lower valve 52 in the vertical line VL direction.

The first connector part 52b is arranged further to the vehicle front side than the second connector part 52c in the bottom surface 52a of the lower valve 52. The second connector part 52c is arranged further to the vehicle rear side than the first connector part 52b in the bottom surface 52a of the lower valve 52. The range switching device W is arranged between the first connector part 52b and the second connector part 52c in the vehicle longitudinal direction.

At the upper side of the control valve unit 5 in the vertical line VL direction, the abovementioned connector terminal C1 is fixed to the side plate 61 of the electric oil pump 6. In this state, the connector terminal C1 is electrically connected with the connector part 91 of the transmission controller 9 (see virtual line in FIG. 6).

As shown in FIG. 6, one end 10a of a wire harness 10 and one end 11a of a wire harness 11 are each connected to the connector terminal C1.

The one ends 10a, 11a of the wire harnesses 10, 11 in the connector terminal C1 are connected to the region on the side opposite to the connector part 91 (right side in FIG. 6) in the vehicle longitudinal direction.

As shown in FIG. 5, the other end 10b of the wire harness 10 is connected to a connector terminal C2. The connector terminal C2 is electrically connected with the first connector part 52b of the control valve unit 5. Thus, the wire harness 10 electrically connects the transmission controller 9 and the control valve unit 5.

Here, the wire harness 10 is connected with the transmission controller 9 and the control valve unit 5 in a state with the second space S22 and the bulging wall 8 interior space S4 interior arranged aligned in the vehicle lateral direction (see FIG. 5).

In this state, the wire harness 10 is handled and arranged so as to cut across the side of the left side surface 53 of the control valve unit 5 in the vertical line VL direction.

In other words, the wire harness 10 is arranged so as to not overlap the electric oil pump 6 in the vehicle longitudinal direction, and so as to overlap the electric oil pump 6 in the vehicle lateral direction.

[Branch Line]

Here, as shown in FIG. 6, the wire harness 10 has a branch line 101 that branches from the wire harness 10 in the midway position in the lengthwise direction.

In specific terms, as shown in FIG. 6, in the wire harness 10 arranged cutting across the side of the control valve unit 5 vertically, the branch line 101 branches from the region overlapping the control valve unit 5 (the region overlapping the lower valve 52 in FIG. 6).

As shown in FIG. 6, the branch line 101 branched from the wire harness 10 is arranged so as to face the bottom surface 52a side of the lower valve 52 after cutting across a region on the lower side of the external connection connector K and the range switching device W at the vehicle rear side.

A connector terminal C6 connected to a tip 101a of the branch line 101 is connected from the rear side in the vehicle longitudinal direction to the second connector part 52c projecting from the bottom surface 52a of the lower valve 52.

As shown in FIG. 6, in the wire harness 11, one end 11a in the lengthwise direction is connected to the connector terminal C1, and the other end 11b is connected to the terminal part C3 of the first connector K1 of the external connection connector K.

As shown in FIG. 5, the wire harness 11 is arranged with the second space S22 and the bulging wall 8 interior space S4 interior aligned in the vehicle lateral direction, and electrically connects the transmission controller 9 and the first connector K1 of the external connection connector K.

In this state, the wire harness 11 is handled and arranged so as to cut across the top surface 51a of the upper valve 51 in the vehicle lateral direction.

[Power Supply Line]

As shown in FIG. 6, at the upper side of the control valve unit 5, one end 12a of the power supply line 12 is connected to the power supply connector C5 of the electric oil pump 6. An other end 12b of the power supply line 12 is connected to the terminal part C4 of the second connector K2 of the external connection connector K.

Therefore, the power supply line 12 electrically connects the electric oil pump 6, and the second connector K2 of the external connection connector K.

As shown in FIG. 5, the power supply connector C5 is positioned further to the electric oil pump 6 side than the terminal part C4 in the vehicle lateral direction.

For that reason, the power supply line 12 is handled and arranged so that the bulging wall 8 interior space S4 interior is aligned in the vehicle lateral direction.

In this state, the power supply line 12 connects the electric oil pump 6 and the external connection connector K (second connector K2) by the shortest distance in the vehicle lateral direction.

With the present embodiment, for the power supply line 12, an item with a thicker diameter than the wire harnesses 10, 11 is used. This is because a large amount of power is flowed to the electric oil pump 6.

As described above, the continuously variable transmission 1 (power transmission device) of the present embodiment has the following configuration.

(1) The continuously variable transmission 1 has
the first chamber S1 in which the variator 20 (power transmission mechanism) is arranged, and
the second chamber S2 in which the electric oil pump 6 (oil pump) is arranged.

The continuously variable transmission 1 has the wire harness 10 (first electric wire), the transmission controller 9 (controller), and the control valve unit 5 (control unit) connected with the transmission controller 9 via the wire harness 10.

The wire harness 10 is provided inside the second chamber S2, and is arranged at a position that does not overlap with the electric oil pump 6 in the vehicle longitudinal direction (first direction) that is the direction facing from the electric oil pump 6 to the transmission controller 9.

The wire harness 10 is provided at a position that overlaps with the electric oil pump 6 in the direction facing from the electric oil pump 6 to the transmission controller 9 (first direction), and the wire harness 10 is arranged between the electric oil pump 6 and the transmission controller 9 in the first direction. In this case, the dimension in the first direction of the continuously variable transmission 1 increases.

In light of that, by configuring as described above, when the wire harness 10 is arranged at a position that does not overlap with the electric oil pump 6 in the first direction, the electric oil pump 6 and the wire harness 10 are arranged at positions (offset positions) separated in a second direction (vehicle lateral direction) orthogonal to the first direction.

In this case, it is possible to suppress an increase in the dimension in the direction facing from the electric oil pump 6 to the transmission controller 9 (first direction).

The continuously variable transmission 1 (power transmission device) of the present embodiment has the following configuration.

(2) The first chamber S1, the electric oil pump 6, and the transmission controller 9 overlap in the vehicle longitudinal direction.

The wire harness 10 is arranged at a position that overlaps with the electric oil pump 6 in the vehicle lateral direction (second direction) that intersects the vehicle longitudinal direction.

The first chamber S1 in which the variator 20 is arranged is huge compared to the electric oil pump 6. For that reason, there is space (bulging wall 8 interior space S4) that can be effectively used on the vehicle lateral direction side (paper surface front side in FIG. 1) of the electric oil pump 6.

In light of that, by configuring as described above, the second chamber S2 is expanded to the vehicle lateral direction side, the space (interior space S4) is formed, and by arranging the wire harness 10 in the formed space (interior space S4), it is possible to make effective use of the layout.

The continuously variable transmission 1 (power transmission device) of the present embodiment has the following configuration.

(3) The continuously variable transmission 1 has the wire harness 11 (second electric wire), the power supply line 12 (third electric wire), and the external connection connector K.

The wire harness 11 connects the transmission controller 9 and the external connection connector K.

The power supply line 12 connects the electric oil pump 6 and the external connection connector K.

The second chamber S2 is partitioned into the first space S21 in which the electric oil pump 6 is arranged, and the second space S22 in which the wire harness 10 is arranged. The second space S22 is connected to the first space S21 in the vehicle lateral direction.

In this case, the external connection connector K is attached to the bulging wall 8 that extends from the side wall part 283 of the wall part 28 that configures the second space S22.

For example, when the external connection connector K is attached to the side wall part 284 (see FIG. 5) side of the wall part 28 that configures the first space S21 in which the electric oil pump 6 is arranged, the wire harness 11 and the power supply line 12 cut across the first space S21.

Having done that, since the wire harness 11 and the power supply line 12 are arranged directly near the electric oil pump 6 which is a heat source, the wire harness 11 and the power supply line 12 are susceptible to the effect of heat.

In light of that, by configuring as described above, it is possible to reduce the effect of heat on the wire harness 11 and the power supply line 12.

The continuously variable transmission 1 (power transmission device) of the present embodiment has the following configuration.

(4) The external connection connector K has the terminal part C3 that connects with the wire harness 11, and another terminal part C4 that connects with the power supply line 12 (third electric wire).

The power supply line 12 is arranged inside the second space S22 within the second chamber S2, and is connected with the electric oil pump 6.

By configuring in this way, by providing the power supply line 12 inside the second chamber S2, it is possible to shorten the length of the power supply line 12, which reduces the cost.

The side wall part 283 of the wall part 28 configures the second space S22. The external connection connector K is attached to the bulging wall 8 extending from this side wall part 283, so it is possible to reduce the effect of the heat of the electric oil pump 6 transmitted via the air to the power supply line 12.

The continuously variable transmission 1 (power transmission device) of the present embodiment has the following configuration.

(5) The power supply line 12 is thicker than the wire harnesses 10, 11.

The terminal part C4 is arranged at a position closer to the electric oil pump 6 than the terminal part C3.

In light of demand, since a larger current flows to the power supply line 12 than the wire harnesses 10, 11, the diameter is larger than that of the wire harnesses 10, 11.

In light of that, by configuring as described above, by providing the terminal part C4 (the other terminal part) of the power supply line 12 near the electric oil pump 6, it is possible to make the thick electric wire shorter and to reduce costs.

The continuously variable transmission 1 (power transmission device) of the present embodiment has the following configuration.

(6) A portion of the branch line 101 that branches from the wire harness 10 is arranged cutting across below the external connection connector K.

By configuring in this way, when branching the wire harness 10, it is possible to use space effectively and suppress an increase in size.

The continuously variable transmission 1 (power transmission device) of the present embodiment has the following configuration.

(7) The continuously variable transmission 1 has the range switching device W.

The range switching device W is positioned between a portion of the branched branch line 101, and the external connection connector K with respect to the vertical line VL direction.

By configuring in this way, it is possible to use space effectively and to suppress an increase in size.

With the present embodiment, the explanation was with the first direction as the vehicle longitudinal direction, and the second direction as the vehicle lateral direction, but the first direction and the second direction are not limited to these.

Modes of the present invention are not limited only to the modes shown in the embodiments noted above. They can be modified as appropriate within the scope of ideas of the technology of the invention.

EXPLANATION OF CODES

1: Continuously variable transmission (power transmission device); 5: Control valve unit (control unit); 6: Electric oil pump (oil pump); 8: Bulging wall; 9: Transmission controller (controller); 10: Wire harness (first electric wire); 11: Wire harness (second electric wire); 12: Power supply line (third electric wire); 20: Variator (power transmission mechanism); 28: Wall part; 101: Branch line; 283: Side wall part; C3: Terminal part; C4: Terminal part (other terminal part); K: External connection connector; S1: First chamber; S2: Second chamber; S21: First space; S22: Second space; VL: Vertical line; and W: Range switching device.

The invention claimed is:

1. A power transmission device comprising:
a power transmission mechanism arranged in a first chamber;
an oil pump arranged in a second chamber;
a first electric wire;
a controller; and
a control unit connected with the controller via the first electric wire, wherein
the first electric wire is provided inside the second chamber, and is arranged at a position that does not overlap with the oil pump when viewed along a first direction that is a direction facing from the oil pump to the controller,
the first chamber, the oil pump, and the controller overlap when viewed along the first direction, and
the first electric wire is arranged at a position that overlaps with the oil pump when viewed along a second direction that intersects the first direction.

2. A power transmission device comprising:
a power transmission mechanism arranged in a first chamber;
an oil pump arranged in a second chamber;
a first electric wire;
a second electric wire;
a controller;

a control unit connected with the controller via the first electric wire; and an external connection connector that is connected with the controller via the second electric wire, wherein the first electric wire is provided inside the second chamber, and is arranged at a position that does not overlap with the oil pump when viewed along a first direction that is a direction facing from the oil pump to the controller, the second chamber is partitioned into a first space in which the oil pump is arranged, and a second space adjacent to the first space in a second direction that intersects the first direction and in which the first electric wire is arranged, and the external connection connector is attached to a wall part defining the second space.

3. The power transmission device according to claim 2, wherein the external connection connector has a terminal part connected with the second electric wire, and an additional terminal part connected with a third electric wire, and the oil pump is connected with the third electric wire.

4. The power transmission device of claim 3, wherein the third electric wire is thicker than the second electric wire, and the additional terminal part is arranged at a position closer to the oil pump than the terminal part.

5. The power transmission device according to claim 2, wherein a portion of a branch line branched from the first electric wire is arranged cutting across a region below the external connection connector.

6. The power transmission device according to claim 5, further comprising a range switching device positioned between the portion of the branch line and the external connection connector.

7. The power transmission device according to claim 3, wherein the third electric wire is arranged within the second chamber.

8. The power transmission device according to claim 2, wherein the second electric wire is arranged within the second chamber.

9. The power transmission device according to claim 1, wherein the first direction is the vehicle longitudinal direction.

10. A power transmission device comprising:

a power transmission mechanism arranged in a first chamber;

an oil pump arranged in a second chamber;

a first electric wire;

a controller; and a control valve unit connected with the controller via the first electric wire, wherein the first electric wire is provided inside the second chamber, and is arranged at a position that does not overlap with the oil pump when viewed along a first direction that is a direction facing from the oil pump to the controller.

11. The power transmission device according to claim 2, wherein the first direction is the vehicle longitudinal direction.

12. The power transmission device according to claim 10, wherein the first direction is the vehicle longitudinal direction.

13. The power transmission device according to claim 2, wherein the first chamber, the oil pump, and the controller overlap when viewed along the first direction, and the first electric wire is arranged at a position that overlaps with the oil pump when viewed along a second direction that intersects the first direction.

14. The power transmission device according to claim 1, wherein the control unit is a control valve unit.

15. The power transmission device according to claim 2, wherein the control unit is a control valve unit.

* * * * *